Jan. 16, 1945.　　　J. C. MORRELL　　　2,367,418
EYEGLASSES
Filed May 12, 1941　　　2 Sheets-Sheet 1
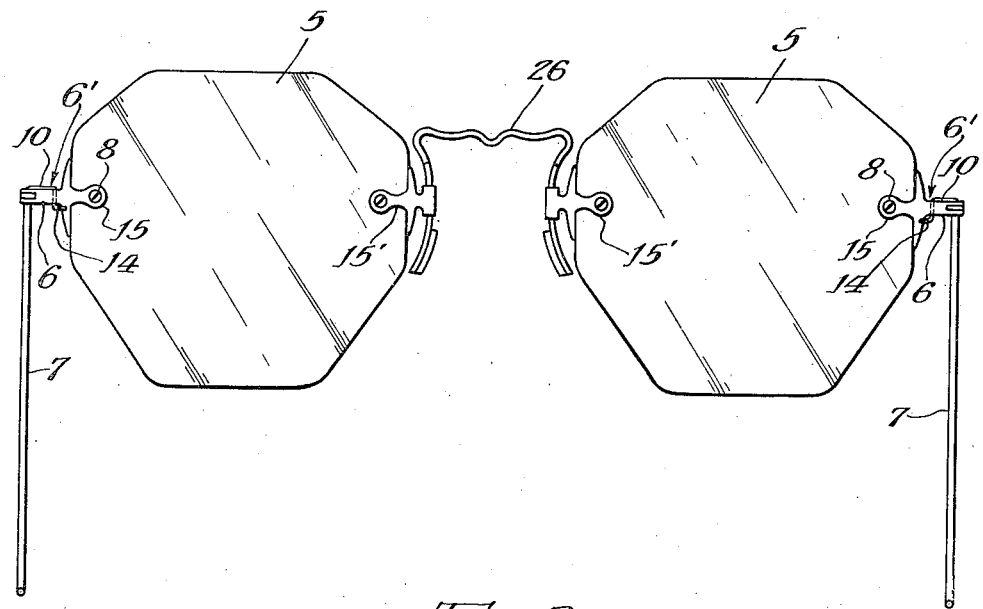
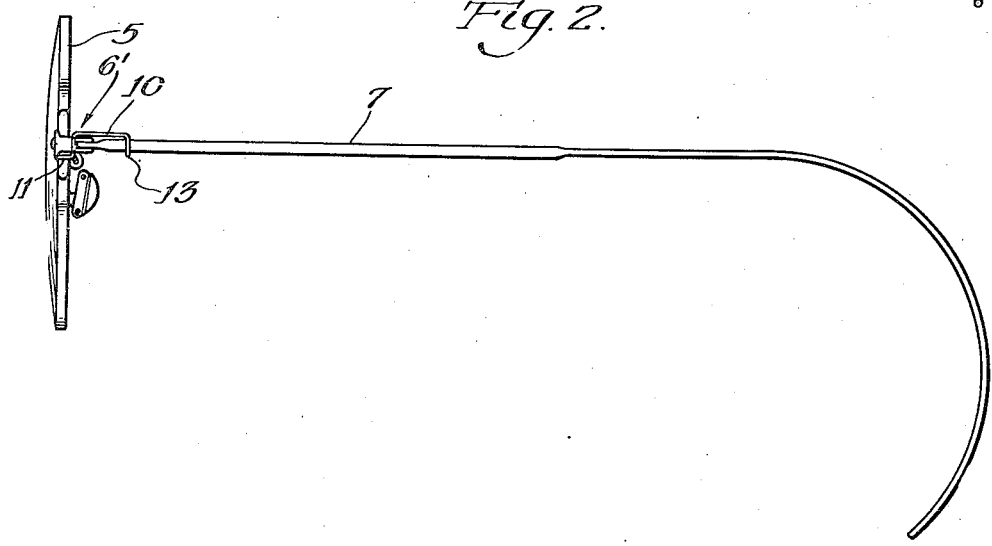
Inventor:
Jacque C. Morrell Jan. 16, 1945. J. C. MORRELL 2,367,418
EYEGLASSES
Filed May 12, 1941 2 Sheets-Sheet 2
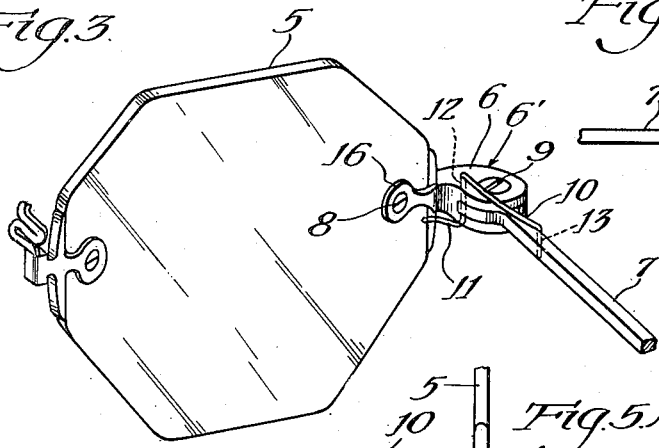
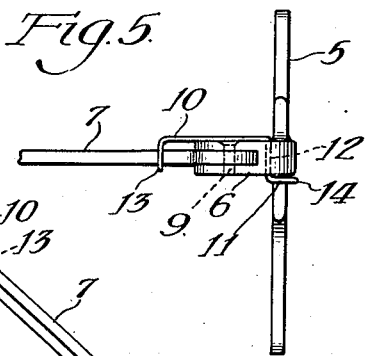
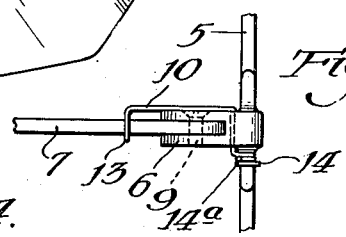
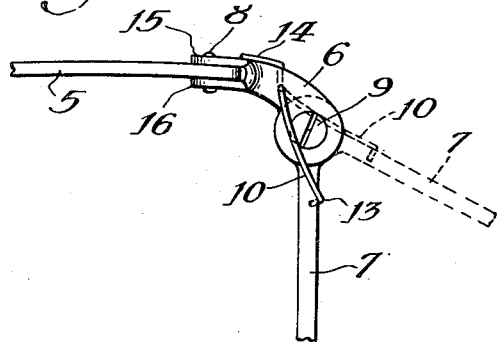
Inventor:
Jacque C. Morrell Patented Jan. 16, 1945

2,367,418

UNITED STATES PATENT OFFICE 2,367,418

EYEGLASS

Jacque C. Morrell, Oak Park, Ill.

Application May 12, 1941, Serial No. 393,029

2 Claims. (Cl. 88—53)

This invention relates to improvements in eyeglasses and more particularly relates to improved rimless eyeglasses so constructed that the stress which is normally placed upon the lens at the point where the temple member is joined to the lens by the stem is reduced thereby avoiding breakage of the lens at this point.

Rimless glasses have always been preferred from the viewpoint of appearance and the only reason why rims or partial rims have been employed is to avoid breakage of the lens of the eyeglasses and to reduce the expense of recurring replacement of the same. Glasses with entire rims are unsightly. Those with partial rims have a tendency to break at the only point of support namely at the nose bridge. By removing or cushioning the stress at the juncture of the stems (which support the glasses by passing around the ear) and the lenses the primary objection to rimless glasses is eliminated. The problem of removing strain has been solved by me in the present invention.

Referring to the drawings:

Fig. 1 is a front elevational view of a pair of rimless eyeglasses embodying my invention.

Fig. 2 is a side elevational view of the glasses shown in Fig. 1.

Fig. 3 is a fragmentary perspective view of part of an eyeglass embodying my invention.

Fig. 4 is a fragmentary detailed plan view of one end of the eyeglass shown in Fig. 3.

Fig. 5 is a side elevation view of the device shown in Fig. 3.

Fig. 5A is a detailed end elevational view of a modified form.

Referring to Figs. 1 and 2, 5 designates the lenses of the eyeglasses, 6' is a bifurcated yoke consisting of hinged support 6 and ears 15 and 16. 6 is the hinged support for stems 7. 8 is a fastening means for connecting the stems to the lens. 9 is the hinge pin or screw, and 10 is the spring tension or resilient member which represents one of the main features of my invention, which cushions the stress normally placed upon the ears 15 and 16 due to leverage upon stems 7 and which would under ordinary circumstances crack or snap off a portion of the lens 5, when the ordinary hinge construction is used. 13 is part of spring 10 which is turned down and engages the stem 7, thus imparting tension to spring 10, when the stem is swung to a wide angle position, and relieving the stress upon the lens. Ears 15' connect the lenses 5 with bridge 26.

Referring to Figs. 3 and 5 which show a more detailed view of my improvement 5 designates the lens of the eyeglasses, 6' is a bifurcated yoke consisting of hinged support 6 and ears 15 and 16. 6 is a hinged support for the stems or temple members 7, one of which is shown. 8 is the fastening means, 9 is a hinge pin or screw, 10 is the spring tension member referred to in connection with the description of Figs. 1 and 2, having bent portions 11, 13 and 14, 13 being bent around the stem and engaging the same, and 14 being bent around the lower portion of the ear or clamp which holds the lens. 12 is a hole drilled in the hinge member 6 which allows one portion of the spring to enter and pass therethrough. 15 and 16 are bifurcated ears that straddle and clamp the lens 5.

In Fig. 4 the position of the temple member is shown as though applied to the ear of a person and in the dotted lines the position the stem would assume if the wearer would hold the stem in his hand and place a stress upon it. In this position it is obvious that the stress is taken up by the spring 10 which thereby relieves the stress that would normally be imposed upon the lens through the bifurcated members or ears 15 and 16. The stress upon the ears 15 and 16 due to the leverage of the temple 7 would crack or snap off a portion of the lens 5 when the ordinary hinge construction is used.

The spring member 10 and the various parts connected therewith, as shown in Figs. 1 to 5, inclusive, illustrate the preferred form of my invention, which is preferred because of its simplicity, ease and low cost of application and also because in actual practice it cannot be noticed except upon the closest examination, when the proper type of spring and finish is employed, the finish preferably corresponding to the finish of the hinge and stem.

Fig. 5A is a slightly modified form of my invention shown in Figs. 1 to 5 inclusive, wherein the spring 10 at its lower end has interposed as an integral part thereof a coil spring 14a to add flexibility. This modification, however, is not necessary for the proper working and operation as shown in the other modifications hereinbefore referred to.

In addition to minimizing breakage of the lens of rimless glasses and thereby removing the main objection thereto my improvement has the advantage that the temple pieces generally snapback in a closed position when not in use or exert a gentle spring tension thereon when in a normal position, which tension increases as the temples are forced outwardly.

While I have described several modifications of my invention it is obvious that there may be some departures which are however within the broad spirit and scope of my invention. I therefore do not desire to be limited to the specific forms illustrated herein.

I claim as my invention:

1. In an eyeglass having a pair of lenses connected by a bridge, a yoke connected to each lens, a stem hingedly connected to each yoke and swingably mounted thereon, means for resiliently restraining excess swinging movement of said stem with respect to said yoke comprising a spring, said spring being positioned intermediate its length in an aperture in said yoke and being freely movable therein, a portion of said spring adjacent an end thereof abutting said yoke when said spring is subjected to torsion, and a portion of said spring adjacent the opposite end thereof bearing upon said stem.

2. In an eyeglass having a pair of lenses connected by a bridge, a lens holding means secured to each lens, a stem hingedly connected to each of said lens holding means and swingably mounted thereon, means for resiliently restraining excess swinging movement of said stem with respect to said lens holding means comprising a spring, said spring being positioned intermediate its length in an aperture in said lens holding means and being freely movable therein, a portion of said spring adjacent an end thereof abutting said lens holding means when said spring is subjected to torsion, and a portion of said spring adjacent the opposite end thereof bearing upon said stem.

JACQUE C. MORRELL.